United States Patent [19]

Adams et al.

[11] 4,322,986
[45] Apr. 6, 1982

[54] VARIABLE RATIO RACK AND PINION GEAR

[75] Inventors: Frederick J. Adams, Clevedon; Philip A. Downing, Bristol, both of England

[73] Assignee: Cam Gears Limited, Hertfordshire, England

[21] Appl. No.: 95,451

[22] Filed: Nov. 19, 1979

[30] Foreign Application Priority Data

Nov. 27, 1978 [GB] United Kingdom ............... 46122/78
May 31, 1979 [GB] United Kingdom ............... 18997/79

[51] Int. Cl.³ ..................... F16H 27/02; F16H 29/20; F16H 1/04
[52] U.S. Cl. ................................... 74/89.18; 74/422; 74/498
[58] Field of Search ............. 74/410, 393, 422, 425.5, 74/499, 89.11, 498, 500, 89.17, 89.18, 89.19

[56] References Cited

U.S. PATENT DOCUMENTS

| 3,505,899 | 4/1970 | Dye ....................................... 74/499 |
| 4,186,615 | 2/1980 | Adams ............................... 74/89.15 |
| 4,217,793 | 8/1980 | Abe ................................ 74/425.5 X |

FOREIGN PATENT DOCUMENTS

| 2223527 | 5/1971 | Fed. Rep. of Germany . |
| 2800163 | 7/1978 | Fed. Rep. of Germany . |
| 2809221 | 9/1978 | Fed. Rep. of Germany . |
| 609356 | 9/1948 | United Kingdom . |
| 2012389 | 7/1979 | United Kingdom ................... 74/499 |

*Primary Examiner*—C. J. Husar
*Assistant Examiner*—Conrad Berman
*Attorney, Agent, or Firm*—Yount & Tarolli

[57] ABSTRACT

A variable ratio rack and pinion gear having a rack bar (1) the rack (8) of which engages with the pinion (10) so that rotation of the pinion displaces the rack member (1) longitudinally relative to the housing (6). A yoke (25) supports the member (1) with its teeth in engagement with the pinion and straddles the member (1) to restrain displacement of that member relative to the housing (6) in a direction parallel to the axis of rotation for the pinion (10). The rack member is restrained from rotation relative to the housing, and (1) has a longitudinally extending non-rectilinear grooved track of one or more curved portions (14) which is engaged by a peg (17) rotatably carried in a mounting block (21). The block (21) retains the yoke (25) in the housing with the peg (17) located within and extending through the yoke (25). The peg (17) engages with the track (14) so that during longitudinal displacement of the rack member (1) the reaction between the groove (14) and peg (17) imparts limited controlled rotation to the member (1) to vary the ratio of the gear. Consequently, by appropriately shaping the track the gear assembly can be provided with a predetermined variable gear ratio. For example, the track may be a helix of variable pitch to provide the variable gear ratio. The peg can rotate in its mounting block (21) to alleviate friction between the peg and rack member (1) during displacement of the latter and can be spring biased to urge and support the rack member for engagement with the pinion.

In a modification, the grooved track (14) is engaged by the peripheral edge of a rotatably mounted roller or wheel located within the yoke so that engagement between the roller and rack member (1) imparts rotation to the rack member to vary the gear ratio during displacement of the rack member.

The teeth of the rack member can extend part way only around the periphery of that member while the non-toothed peripheral portion provides a slideway within which the groove (14) is machined and with which the yoke (25) slidably engages.

18 Claims, 8 Drawing Figures

VARIABLE RATIO RACK AND PINION GEAR

DESCRIPTION

This invention relates to a variable ratio rack and pinion gear.

More particularly, the invention concerns a variable ratio rack and pinion gear which includes a rack member having a longitudinal axis in the direction of which it is displaceable relative to a housing; a pinion rotatably mounted in the housing and engaging with rack teeth on the rack member so that rotation of the pinion imparts axial displacement to the rack member; support means for supporting the rack member with its teeth in engagement with the pinion; and in which the rack member has a longitudinally extending non-rectilinear track which is engaged by a track follower secured relative to the housing so that during said longitudinal displacement of the rack member the reaction between the track and the follower imparts axial rotation to the rack member to vary the ratio of the gear. Such a rack and pinion gear will hereinafter be referred to as "of the kind specified".

A gear of the kind specified is disclosed, for example in U.K. Pat. No. 609,356 and in German Offenlegungsschrift No. 2,223,527. It has hitherto been proposed in our German Offenlegungsschrift Nos. 2,800,163 and U.S. Pat. No. 4,270,397, assigned to the assignee of the present invention to provide a gear of the kind specified with support means which is interposed between the rack member and the housing to support the rack member on the side thereof remote from the position of engagement between the rack teeth and the pinion with the rack teeth in engagement with the pinion. In the latter of our aforementioned Offenlegungsschrifts, it has also been proposed for the support means to straddle the rack member to restrain displacement thereof relative to the housing in a direction which is substantially parallel about which the pinion rotates. In the above mentioned prior proposals, the structure of the housing is rendered somewhat complex by the mountings for the support means and for the track follower and it is an object of the present invention to provide a gear of the kind specified in which the rack member has support means which can be incorporated together with the track follower in a relatively uncomplicated housing to provide a compact assembly as compared with the prior proposals.

According to the present invention, there is provided a variable ratio rack and pinion gear of the kind specified and having a support assembly which is located on the side of the rack member remote from the position of engagement between the rack and pinion teeth to support the rack member with the rack teeth in engagement with the pinion; said support assembly comprising the follower and means which straddles and is in sliding engagement with the rack member, and wherein said straddle means restrains displacement of the rack member relative to the housing in a direction which is substantially parallel to the axis about which the pinion rotates and the follower is located within the straddle means to engage with the track. The track is preferably formed as a groove in the rack member and with which groove the follower engages; for convenience the track will therefore be referred to as a grooved track although it will be appreciated that the track can be other than a groove provided that appropriate engagement is effected therewith by the follower to impart the controlled rotation to the rack member for ratio variation.

By the invention, the track follower is located within the straddle means so avoiding the requirement of discrete housing parts for both the straddle means and the follower. Furthermore, the straddle means and follower can be incorporated in the housing to co-operate with the rack member and grooved track, respectively, as a unified assembly which may facilitate both construction of the gear and replacement for servicing of the straddle means or follower as necessary. To provide optimum support for the rack member with its rack in engagement with the pinion, it is preferred that the support assembly is mounted so that it co-operates with the rack member at a position which is substantially in lateral alignment with, and on the side of the rack member remote from, the position of engagement between the rack and pinion teeth.

Support to retain the rack member laterally in engagement with the pinion can be provided by either or both the straddle means and the follower. For example, the straddle means can co-operate with the rack member solely for the purpose of restraining displacement of that member in the general direction of the axis about which the pinion rotates while the follower both engages with the grooved channel and serves to support the rack member laterally with its teeth in engagement with the pinion; alternately, the straddle means can be in the form of yoke means which co-operates with the rack member both to restrain displacement of that member in the general direction of the axis about which the pinion rotates and to support the rack member laterally with its teeth in engagement with the pinion while the follower serves for the purpose of changing the ratio of the gear by engagement of the follower with the grooved track (and possibly for the purpose of additionally supporting the rack member with its teeth in engagement with those of the pinion). Preferably, at least one of the follower and straddle means (as appropriate) is resiliently mounted to support and urge the rack teeth laterally into engagement with the pinion.

The straddle means can comprise an assembly of two or more parts (such as a split yoke) which are retained together in the housing to straddle and provide the necessary restraint (and possible support) for the rack member, but preferably, such straddle means is in the form of a one piece member. The straddle means will usually be provided with a central opening or bore from which the follower extends to engage the grooved track, such follower being mounted either in the straddle means or in a further component so that it extends through the straddle means to engage with the track. The follower can be an integral part of or mounted directly by the straddle means; more conveniently however, the follower will be carried by a mounting block which latter forms part of the support assembly and can conveniently serve to retain the straddle means within the housing or can itself be retained together with the straddle means within the housing.

To alleviate friction between the follower and rack member during relative longitudinal displacement between these components, it is preferred that the follower is rotatably mounted to exhibit rotation during such displacement. In a preferred form, the follower is a peg an end of which engages within the grooved track; desirably, the peg is mounted for rotation about its longitudinal axis which axis extends substantially radially and perpendicularly relative to the longitudinal axis along which the rack member is displaceable. Alternatively, the follower can be in the form of a rotatably mounted roller the peripheral edge of which engages with the grooved track so that rotation of the roller is effected by longitudinal displacement of the rack member to alleviate friction between that member and the roller. Desirably, the roller is mounted in the support assembly to swivel in a plane which is substantially perpendicular to the plane in which it is rotated so that by such swivelling motion the roller can align itself with the longitudinal profile of the grooved track over the region with which it engages.

In a similar manner to the proposal in U.S. Pat. No. 4,270,397, it is preferred that the rack teeth extend part way only around the periphery of the rack member and to an extent that they maintain engagement with the pinion throughout the intended rotation of the rack member during longitudinal displacement of the latter; by this arrangement the non-toothed peripheral part of the rack member which is longitudinally co-extensive with the rack can be in the form of a slideway which the straddle means straddles (and slidably engages) and within which the grooved track is located.

The rack member can be in the form of a rotatably mounted rack bar which extends from the housing or can be in the form of a rack assembly in which the rack member comprises a sleeve which is rotatably mounted relative to and longitidinally displaceable in unison with a non-rotatable bar which extends longitudinally from the housing.

One embodiment of a variable ratio rack and pinion gear of the kind specified and constructed in accordance with the present invention will now be described, by way of example only, with reference to the accompanying illustrative drawings in which.

Figure 1:
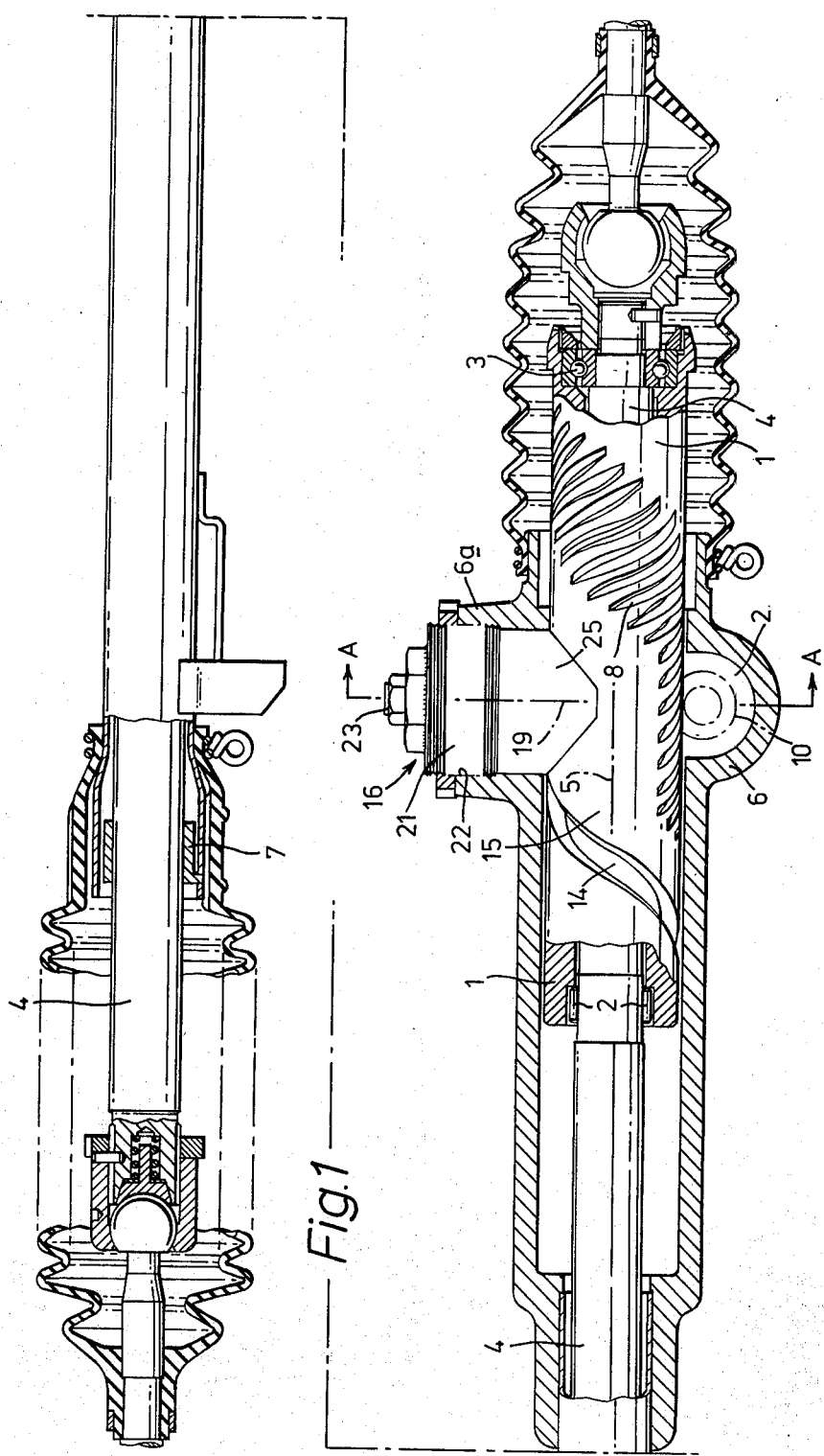
FIG. 1 is a side elevation of the gear in part section.

The gear has a rack member 1 which, in FIGS. 1 to 5, is in the form of a cylindrical sleeve comprising part of a rack assembly. The sleeve 1 is rotatably mounted by needle bearings 2 and a ball race 3 on a generally cylindrical bar 4 to be capable of rotation about a longitudinally extending axis 5. The sleeve 1 is retained against axial displacement relative to the bar 4, conveniently by the bearings 2 and 3, so that the rack assembly is displaceable along the axis 5 as a unit and relative to a housing 6 within which the sleeve 1 is located and from which the bar 4 extends. The bar 4 is supported for axial sliding movement relative to the housing by a bearing sleeve 7.

The outer cylindrical surface of the sleeve 1 has machined therein rack teeth 8. Engaging with the teeth 8 are the teeth 9 of a pinion 10 which is rotatably mounted by ball races 11 in a pinion chamber 12 of the housing 6.

The pinion teeth 9 engage with the rack teeth 8 so that upon rotation of the pinion 10 through an input shaft 13 which extends from the housing, the rack assembly formed by the sleeve and bar is displaced as a unit in one or the opposite senses of direction along the axis 5 and relative to the housing 6. If required, the rack member 1 can be formed integral with the bar 4 (as indicated at 1' in FIGS. 6 and 7) provided that such integral construction is capable of rotating as a whole about the axis 5 and with respect to the housing 6.

Machined in the outer cylindrical surface of the rack member 1 is a track 14 which extends longitudinally relative to the member 1 and has a non-rectilinear profile. The track 14 has surfaces which define a groove in the rack member. As indicated in FIG. 1, the track has a part length of helical formation but it will be apparent that the profile of this track will be formed in accordance with desired variations in ratio which are to be provided by the gear in transmitting drive from the pinion 10 to the rack member 1. By engaging a follower within the track 14 and which follower is secured relative to the housing in the sense that it is not displaceable in the direction of, nor rotatable about, the axis 5, it will be apparent that as the rack member 1 is displaced longitudinally relative to the housing 6 by driving engagement from the pinion 10, the reaction between the grooved track 14 and the follower will impart rotation to the rack member 1 in accordance with the profile of the track of the groove and that such controlled rotation of the rack member 1 causes a variation in the ratio of the gear. As will be seen from FIG. 1, the teeth 8 of the rack extend part way only around the circumference of the rack member 1 and to an extent that they will maintain efficient engagement with the teeth 9 of the pinion throughout the intended rotation of the rack member 1 during its longitudinal displacement and as determined by the profile of the groove track. From FIG. 2 it will be seen that the circumferential extent of each rack tooth is a minor part of the circumference of the rack member 1 and the non-toothed circumferential part of the rack member 1 which is longitudinally co-extensive with the rack 8 forms a substantially plane slideway 15 within which the groove 14 is machined. Associated with this slideway 15 and located on the side of the rack member 1 diametrically opposite the position of engagement between the rack teeth 8 and the pinion 10 to support the rack member 1 with its rack teeth in engagement with the pinion 10 is a support assembly 16 which assembly includes the follower which is in engagement with the track 14 and also includes a straddle member which slidably engages with the rack member 1.

Figure 2:
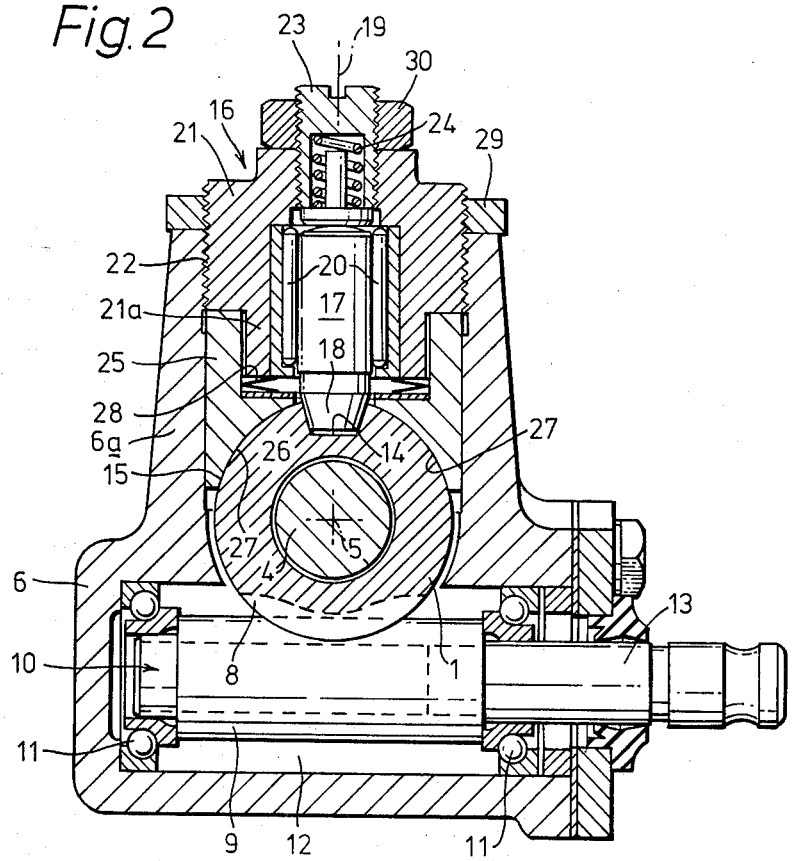
FIG. 2 is a section through the gear taken on the line A—A of FIG. 1 and particularly illustrates the support assembly.

In the embodiment of FIGS. 1 and 2, the follower is in the form of a generally cylindrical peg 17 having a frusto conical nose 18 which engages within the track 14. The peg 17 is mounted for rotation about its axis 19 in needle rollers 20 in an annular mounting block 21. The mounting block 21 is externally screw threaded to engage with a corresponding internal thread at 22 with a tubular extension 6a of the housing so that the peg 17 engages with the track 14 with the peg axis 19 extending radially and substantially perpendicularly relative to the longitudinal axis 5 of the rack member 1 and on the side of that member diametrically opposite to the position of engagement between the rack teeth 8 and pinion teeth 9. The peg 17 is rotatably mounted in bearings 20 to exhibit rotation by its engagement with the track 14 and during relative longitudinal displacement between the groove and peg to relieve friction between those components. Reacting between a shoulder of the peg 17 and a screw 23 which engages with the mounting block 21 and is adjustable along the axis 19, is a helical spring 24 which biases the peg 17 along its axis 19 and into engagement with the track 14. Also located within the chamber formed by the housing extension 6a as a close sliding fit with the internal walls of that extension is the straddle member which is in the form of a yoke 25 which is retained in the housing by the mounting block 21 between that block and the rack member 1. The yoke 25 has a central opening 26 through which the peg 17 engages with the track 14 and a part cylindrical bearing surfaced 27 which is substantially complementary to, and slidably engages, the cylindrical slideway 15 formed on the surface of the rack member 1. Conveniently the peg 17, screw 23, mounting block 21 and yoke 25 are generally cylindrical and co-axial with the axis 19. A reduced diameter part 21a of the mounting block is slidably received along the axis 19 in a substantially complementary cylincrical counter bore of the yoke 25. Annular spring washers 28 or other appropriate springs are located between the mounting block 21 and the yoke 25 to bias the yoke (relative to the mounting block and thereby relative to the housing 1) into engagement with the rack member 1 and this biasing effect urges the rack teeth into, and supports them for, engagement with the pinion teeth 9. In addition, the manner in which the yoke 25 straddles the rack member 1 as shown in FIG. 2 restrains the rack member 1 (and thereby the rack bar assembly) against displacement in a direction parallel to the axis about which the pinion 10 rotates.

From the arrangement as above described and illustrated, it will be apparent that the support assembly 16 is easily adjusted by rotation of the mounting block 21 to provide desired thrust from the yoke to support the rack member and by rotation of the screw 23 to provide the required thrust with which the peg 17 engages in the track 14. Furthermore, the support assembly 16 is easily assembled with, or removed from, the housing 1 as a unit which is convenient both from the point of view of manufacture and servicing. Lock nuts 29 and 30 are provided for the mounting block 21 and adjustment screw 23, respectively.

Figure 3:
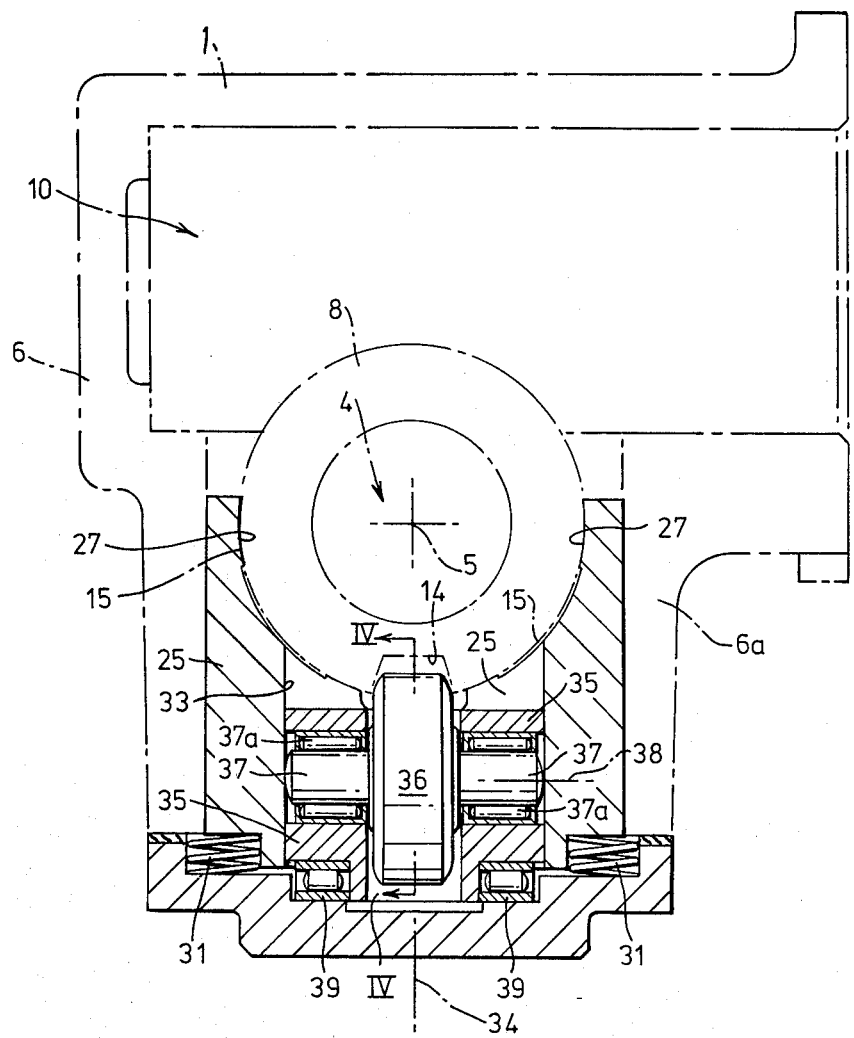
FIG. 3 is a similar section to that shown in FIG. 2 and illustrates a first modified form of support assembly.
Figure 4:
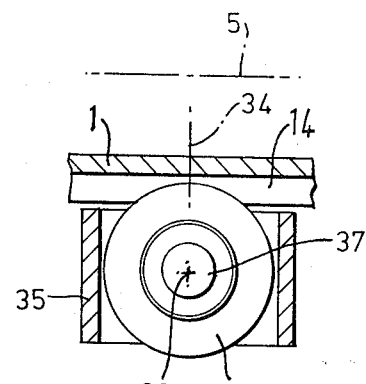
FIG. 4 is a section of the gear shown in FIG. 3 taken on the line IV—IV of that Figure.

In the modification shown in FIGS. 3 and 4, the yoke 25 is resiliently biased into engagement with the rack member 1 and to straddle the slideway 15 in a similar manner to that previously described by a helical spring 31 which reacts against a closure plate 32 of the tubular housing extension 6a. The plate 32 may be bolted or screw threadedly connected to the housing 1. Yoke 25 has a cylindrical bore 33 the axis 34 of which extends radially and substantially perpendicularly relative to the axis 5. Mounted within the bore 33 and in substantially complementary sliding relationship therewith along the axis 34 is a mounting block 35 within which is mounted a follower in the form of a wheel or roller 36. The roller 36 is mounted by stub shafts 37 in needle bearings 37a or other bearings in the mounting block 35 for rotation about an axis 38 so that the peripheral edge of the roller 36 engages within the groove 14. From FIG. 3 it will be seen that the edge of the roller 36 is profiled to engage the groove 14 in a substantially complementary manner. The axis 38 about which the roller 36 rotates extends through, and is substantially perpendicular to the axis 34 and these axes are located so that the roller 36 engages with the groove 14 at a position on the side of the rack member 1 which is substantially diametrically opposite to the position of engagement between the rack teeth 8 and the pinion teeth 9.

So that the roller 36 can follow the profile of the track 14 where this deviates from a longitudinal direction, which is other than parallel to the longitudinal axis 5, the mounting block 35 can rotate about axis 34 within the cylinder 33 to adopt an appropriate position of alignment with the track 14 whilst the roller rotates about its axis 38 during longitudinal displacement of the groove to alleviate its frictional engagement therewith. To facilitate rotation of the mounting block about axis 34, a thrust race or similar bearing 39 is provided between the closure plate 32 and the mounting block 35. If required, shims (not shown) can be located between the thrust bearing 39 and the closure plate 32 to provide an appropriate thrust with which the roller 36 engages the track 14.

Figure 5:
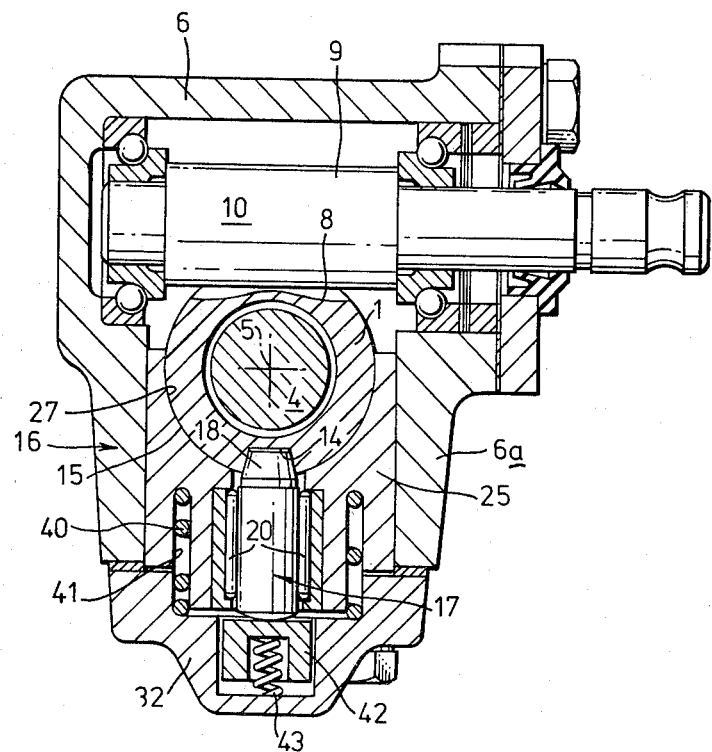
FIG. 5 is a similar section to that shown in FIG. 2 and illustrates a second modified form of support assembly.

In the modification shown in FIG. 5, the yoke 25 straddles the sleeve 1 to slidably engage, in substantially complementary manner, with the surface of the slideway 15 over a greater circumferential extent than that shown in the FIG. 2 arrangement. Such greater peripheral engagement between the yoke 25 and the slideway 15 provides considerable support for the rack assembly to restrain displacement of that assembly in the direction of the pinion axis. The yoke 25 is biased into supporting engagement with the sleeve 1 by a helical spring 40 which is received in an annular recess 41 in the yoke and which reacts against the closure plate 32 (the latter being bolted to the housing extension 6a). A further feature of the modification in FIG. 5 is that the yoke is of tubular form and the cylindrical peg 17 is mounted for rotation about its axis 19 in the needle rollers 20 which, in this case, are located within the bore of the yoke 25. The peg 17 is biased along its axis 19 into engagement with the track 14 by a cap 42 which is spring loaded at 43 relative to the closure plate 32.

Figure 6:
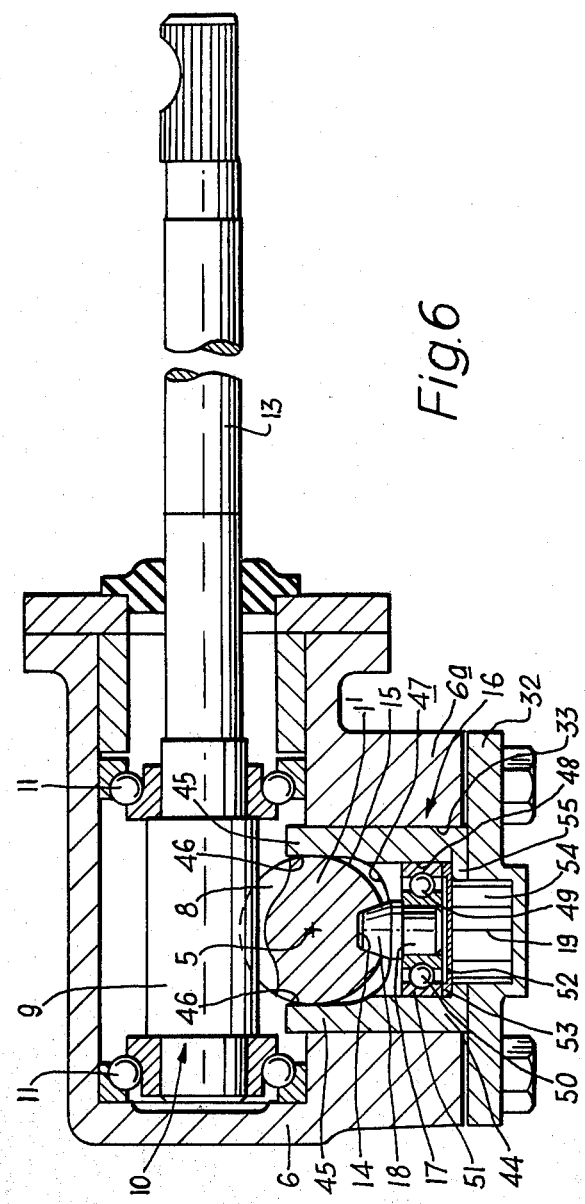
FIGS. 6 and 7 are similar section to that shown in FIG. 2 and respectively illustrate third and fourth modified forms of support assembly.
Figure 8:
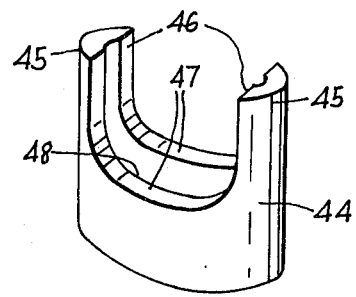
FIG. 8 is a perspective view illustrating a straddle member which forms part of the support assemblies in FIGS. 6 and 7.

In the modification shown in FIG. 6, the support assembly 16 includes a tubular straddle member 44 (see FIG. 8) which is slidably received in substantially complementary manner in the cylindrical chamber formed by the housing extension 6a. The straddle member 44 has opposed leg portions 45 between which is received the rack member 1'. More particularly, the leg portions 45 have substantially flat and opposed internal faces 46 which slidably engage with substantially diametrically opposed sides of the slideway 15 on the rack member 1'. The slideably co-operating surfaces 15 and 46 permit longitudinal displacement of the rack member 1' through the housing 6, but restrain displacement of the rack member 1' relative to the housing 6 in the general direction of the axis about which the pinion 10 is rotatable. Unlike the arrangements shown in FIGS. 1 to 5, in the modification shown in FIG. 6, the straddle member 44 does not necessarily support the rack member 1 laterally for its teeth 8 to engage with the pinion teeth 9 and preferably (for ease of manufacture) the opposed surfaces 46 are substantially parallel so that the rack member 1 can be displaced between those opposed surfaces laterally towards and from the pinion 10. Bridging surfaces 47, which communicate between the surfaces 46, may determine (by abutment) the maximum extent to which the rack member 1' can be displaced laterally away from the pinion 10. Preferably, the bridging surfaces 47 are of part circular profile to be substantially complementary with the cylindrical profile of the slideway 15.

Housed within the bore 48 of the straddle member 44 is the peg 17, the nose 18 of which engages with the track 14 formed in the slideway 15. The peg 17 is mounted in the inner race 49 of a ball bearing 50 the outer race 51 of which is an axially displaceable fit within the bore 48 of the straddle member 44. Located on the side of the ball bearing 50, remote from the track 14, is a thrust plate 52 having an upstanding annular flange 53 which bears against the underside of the outer race 51. The thrust plate 52 is axially displaceable through the bore 48 in unison with the ball bearing 50.

The straddle member 44 is retained in the cylindrical chamber 33 by the closure plate 32 which is bolted on to the housing extension 6a. Located between the closure plate 32 and the thrust plate 52 is a mechanical spring 54 which biases the thrust plate 52 and thereby the ball bearing 50 and peg 17 relative to the straddle member 44 for the peg nose 18 to engage with the truck 14. This latter biasing effect also supports the rack member 1' for its teeth 8 to engage the pinion teeth 9. While the spring 54 resiliently supports the peg 17 to bias the peg to urge the rack and pinion teeth into engagement, it will be apparent that since a clearance is provided between the inner race 49 and the thrust plate 52, the peg 17 can rotate about its axis 19 with the inner race 49. It will be noted that the end of the straddle member 44 which bears against the closure plate 32 has a radially inwardly directed flange 55 against which the thrust plate 52 and thereby the ball bearing 50 can bottom; the bottoming effect of the plate 52 on the flange 55 may serve to determine the maximum extent to which the rack teeth 8 can move laterally in the direction of peg axis 19 out of engagement with the pinion teeth 9 by sliding movement of the rack member 1a between the opposed surfaces 46.

Figure 7:
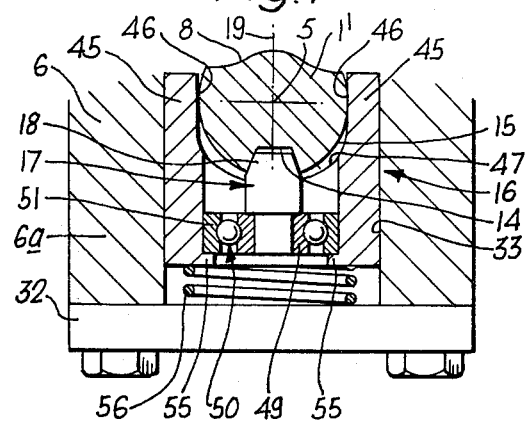

The modification shown in FIG. 7 is similar to that shown in FIG. 6 with the exception that the thrust plate 52 is omitted so that the outer ball race 51 bottoms against the annular flange 55 of the straddle member 45 while the latter is biased by a spring member 56 acting against the closure plate 32 in a direction laterally towards the opening 10. Since the outer race of the bearing 50 bottoms against the flange 55 it will be apparent that the biasing effect of spring 56 urges the peg 17 into engagement with the track 14 and also resiliently supports the rack teeth 8 in engagement with the pinion teeth 9. In a similar manner to the arrangement of FIG. 6, in FIG. 7, the opposed surfaces 46 of the straddle member co-operate with the slideway 15 to restrain displacement of the rack member 1' in the general direction of the axis about which the pinion rotates.

Similarly to the embodiment in FIGS. 1 and 2, it will be apparent that the support assembly 16 in each of FIGS. 3, 5, 6 and 7 is easily removed for servicing or the like, is easily assembled and provides a compact unit.

The embodiment, as shown in FIG. 1, illustrates the invention as applied to a vehicle steering gear in which the ends of the bar 4 are connected through universal joints to tie rods to provide a steering output while the pinion 10 is intended to be rotated in response to a steering input in conventional manner. It is to be realised, however, that the gear of the present invention can be applied for other purposes, for example, in machine tools where the longitudinal displacement of the bar 4 may be utilised to displace a machine component.

If required, longitudinally extending grooves can be provided in the yoke 25 which form lubrication chanels with the slideway surface 15.

We claim:

1. A variable ratio rack and pinion gear comprising a housing, a rack member displaceable relative to the housing, a pinion mounted in the housing for rotation about its axis and having teeth engaging with rack teeth on the rack member to displace the rack member upon rotation of the pinion, means for rotating said rack member during displacement of said rack member, said means comprising a non-rectilinear track associated with said rack member and extending in the direction of displacement of the rack and a track follower engaging said track during displacement of said rack member, the reaction between said track and said track follower imparting rotation to said rack member to vary the ratio of the gear, said housing having a portion arranged diametrically opposite to the position of engagement between the rack teeth and the pinion teeth, a support assembly located in said portion of said housing for supporting the rack member with its rack teeth in engagement with the pinion teeth, said support assembly comprising straddle means for restraining displacement of the rack member relative to the housing in opposite directions substantially parallel to the axis about which the pinion rotates, said straddle means having spaced surfaces slidably engaging said rack member at locations to restrain movement thereof in said opposite directions, said straddle means defining a cavity, said track follower at least in part being located in said cavity defined by said straddle means, and means for preventing movement of said straddle means longitudinally with said rack member.

2. A gear as claimed in claim 1 in which the rack teeth extend part way only around the periphery of the rack member and to an extent that they maintain engagement with the pinion throughout the intended rotation of the rack member during longitudinal displacment thereof and wherein the non-toothed peripheral part of the rack member which is longitudinally co-extensive with the rack forms a slideway which the straddle means slidably engages and within which the track is located.

3. A gear as claimed in claim 1 in which the rack member is of part substantially cylindrical profile and the straddle means is in the form of a yoke having a part substantially cylindrical surface which is substantially complementary to and in sliding engagement with said profile of the rack member.

4. A gear as claimed in claim 1 in which the track comprises a groove in the rack member and said follower engages with said groove.

5. A gear as claimed in claim 4 in which the follower comprises a peg an end of which entends into said groove.

6. A gear as claimed in claim 5 in which the peg has a longitudinally extending axis which extends substantially radially and perpendicularly relative to the longitudinal axis along which the rack member is displaceable.

7. A gear as claimed in claim 6 in which said peg is mounted for rotation during its longitudinal displacement relative to said track to alleviate friction between said peg and said rack member.

8. A gear as claimed in claim 1 including a mounting block secured to said housing and supporting said follower, said mounting block having surfaces engaging said straddle means and preventing movement of said straddle means in a direction transverse to the direction of displacement of said rack member.

9. A gear as claimed in claim 4 in which said straddle means comprises a member having spaced leg portions between which said rack member is received, said leg portions having said spaced surfaces which slidably engage said rack member.

10. A gear as claimed in claim 9, wherein said opposed surfaces of said leg portions are substantially parallel to permit said displacement of said rack member upon rotation of said pinion.

11. A gear as claimed in claim 1 further including first biasing means acting on said straddle means for urging the rack teeth into engagement with the pinion teeth.

12. A gear as claimed in claim 11 further including means for adjusting the force applied by said first biasing means to said straddle means.

13. A gear as claimed in claim 1 further including second biasing means for biasing said follower into engagement with said track.

14. A gear as claimed in claim 13 futher including means for adjusting the force applied by said second biasing means to said follower.

15. A gear as claimed in claim 1 in which the follower comprises a rotatably mounted roller the peripheral edge of which engages with the track.

16. A gear assembly as claimed in claim 15 in which said roller is mounted for rotation about an axis which extends perpendicular to a line which extends perpendicular to the direction of displacement of said rack member.

17. A gear as claimed in claim 16 further including means supporting said roller for swivelling in a plane which is substantially perpendicular to the plane of rotation of said roller to allow alignment of said roller with said track.

18. A gear as claimed in claim 17 in which said means supporting said roller includes a mounting block rotatable in said housing about an axis which is perpendicular to the axis of rotation of said roller to provide said swivelling of said roller.

* * * * *

UNITED STATES PATENT AND TRADEMARK OFFICE
CERTIFICATE OF CORRECTION

PATENT NO. : 4,322,986
DATED : April 6, 1982
INVENTOR(S) : Adams et al.

It is certified that error appears in the above-identified patent and that said Letters Patent are hereby corrected as shown below:

Column 9, line 1, change the numeral "4" to the numeral --1--.

Signed and Sealed this

Twelfth Day of October 1982

[SEAL]

Attest:

GERALD J. MOSSINGHOFF

Attesting Officer     Commissioner of Patents and Trademarks